(12) United States Patent
Whitcomb

(10) Patent No.: US 7,810,275 B2
(45) Date of Patent: Oct. 12, 2010

(54) ROOT GROWTH BARRIER AND METHOD

(75) Inventor: Carl E. Whitcomb, Stillwater, OK (US)

(73) Assignee: Lacebark, Inc., Stillwater, OK (US)

( * ) Notice: Subject to any disclaimer, the term of this patent is extended or adjusted under 35 U.S.C. 154(b) by 2006 days.

(21) Appl. No.: 10/075,096

(22) Filed: Oct. 29, 2001

(65) Prior Publication Data

US 2003/0079401 A1    May 1, 2003

(51) Int. Cl.
*A01G 13/02* (2006.01)
*A01G 9/02* (2006.01)

(52) U.S. Cl. .......................... 47/32.7; 47/32.8; 47/65.8; 47/73

(58) Field of Classification Search ............... 47/32.7, 47/32.8, 65.7, 66.7, 73, 74, 76, 65.8, 75, 47/65.5
See application file for complete search history.

(56) References Cited

U.S. PATENT DOCUMENTS

| | | | |
|---|---|---|---|
| 560,966 A | 5/1896 | Brown | |
| 2,209,778 A | 7/1940 | Krasowski | |
| 2,626,483 A | 1/1953 | Service | |
| 2,848,842 A * | 8/1958 | Tennant, Jr. .................. | 47/65.7 |
| 3,052,063 A | 9/1962 | Dunn | |
| 3,080,680 A * | 3/1963 | Reynolds ....................... | 47/74 |
| 3,094,810 A * | 6/1963 | Kalpin ........................... | 47/73 |
| 3,798,837 A | 3/1974 | Oehmke et al. | |
| 4,250,661 A | 2/1981 | Kodera et al. | |
| 4,442,628 A | 4/1984 | Whitcomb | |
| 4,497,132 A | 2/1985 | Whitcomb | |
| 4,508,776 A | 4/1985 | Smith | |
| 4,510,712 A | 4/1985 | Whitcomb | |
| 4,646,467 A | 3/1987 | Morrisroe | |
| 4,753,037 A | 6/1988 | Whitcomb | |
| 4,818,585 A | 4/1989 | Shipp, Jr. | |
| 4,829,707 A | 5/1989 | Koffler | |

(Continued)

FOREIGN PATENT DOCUMENTS

EP    300578 A3 *  1/1989   .................. 47/65.7

(Continued)

OTHER PUBLICATIONS

McGraw-Hill Dictionary of Scientific and Technical Terms Sixth Edition, p. 423 and p. 1636; Copyright © 2003, 1994, 1989, 1978, 1976, 1974 by McGraw-Hill Companies, Inc.

(Continued)

*Primary Examiner*—Son T. Nguyen
(74) *Attorney, Agent, or Firm*—Jeffrey L. Streets; Streets & Steele

(57) ABSTRACT

A root growth barrier and method for use with transplantable plants is provided. The barrier is a bilayer, comprising an inner layer of a root-tip-trapping material bonded to an outer layer of a root-impenetrable material. The inner layer faces the roots of a plant and serves to trap root tips to promote root branching. When a black or dark-colored inner layer is bonded to a white or light colored reflective outer layer, soil temperatures are lower and water retention is promoted. Such a barrier may be used as a freestanding container for plants or be manufactured into preformed rolls for use in plant pots and containers.

65 Claims, 2 Drawing Sheets

U.S. PATENT DOCUMENTS

| | | | |
|---|---|---|---|
| 4,884,367 A | 12/1989 | Lawton | |
| 4,920,692 A | 5/1990 | Kitamura et al. | |
| 4,939,865 A | 7/1990 | Whitcomb et al. | |
| 5,099,607 A | 3/1992 | Lawton | |
| 5,131,185 A | 7/1992 | Wingerden | |
| 5,181,952 A | 1/1993 | Burton et al. | |
| 5,205,432 A | 4/1993 | Gullan | |
| 5,241,784 A | 9/1993 | Henry | |
| 5,262,233 A | 11/1993 | Sudo et al. | |
| 5,311,700 A * | 5/1994 | Thomas | 47/76 |
| 5,402,600 A | 4/1995 | Tompkins | |
| 5,533,301 A | 7/1996 | Weder et al. | |
| 5,544,447 A | 8/1996 | Easey et al. | |
| 5,557,886 A | 9/1996 | Whitcomb | |
| 5,575,112 A | 11/1996 | Scheubel | |
| 5,636,502 A | 6/1997 | Weder et al. | |
| 5,768,825 A | 6/1998 | Reiger | |
| 5,852,896 A * | 12/1998 | Flasch, Jr. | 47/79 |
| 5,937,577 A | 8/1999 | Butler et al. | |
| 5,983,566 A | 11/1999 | Enderlein et al. | |
| 6,108,974 A | 8/2000 | Herzog-Mesrobian et al. | |
| 6,142,299 A | 11/2000 | Weder et al. | |
| 6,161,332 A | 12/2000 | Avôt | |
| 6,223,466 B1 * | 5/2001 | Billings | 47/79 |
| 2002/0038526 A1 | 4/2002 | Garrofe Morreres | |

FOREIGN PATENT DOCUMENTS

| | | | | |
|---|---|---|---|---|
| FR | 2755950 A1 | | 5/1998 | |
| GB | 2073567 A | * | 10/1981 | |
| GB | 2129664 A | | 5/1984 | |
| JP | 406189635 | * | 7/1994 | 47/65.7 |
| JP | 406269228 A | * | 9/1994 | 47/32 |
| JP | 2001352843 | | 12/2001 | |
| SE | 141561 A | * | 8/1953 | 47/65.7 |

OTHER PUBLICATIONS superoots™ root enhancement systems; superoots products; The Caledonian Tree Co.; Cowbraehill Tynehead Pathhead Midlothian; EH37 5 XT; Scotland UK; 5 pgs. regarding superoots fielder™; www.superoots.com.

* cited by examiner

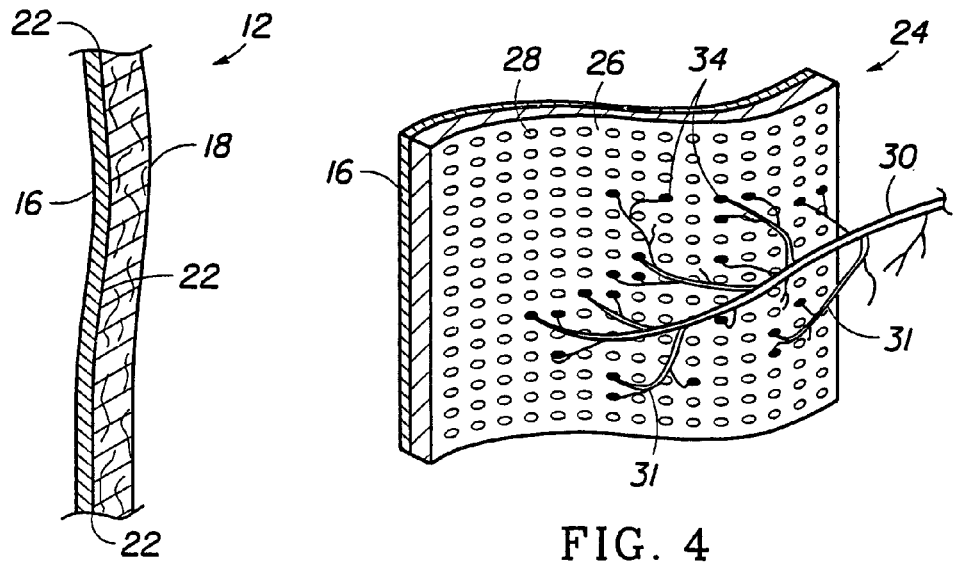
FIG. 3
FIG. 4
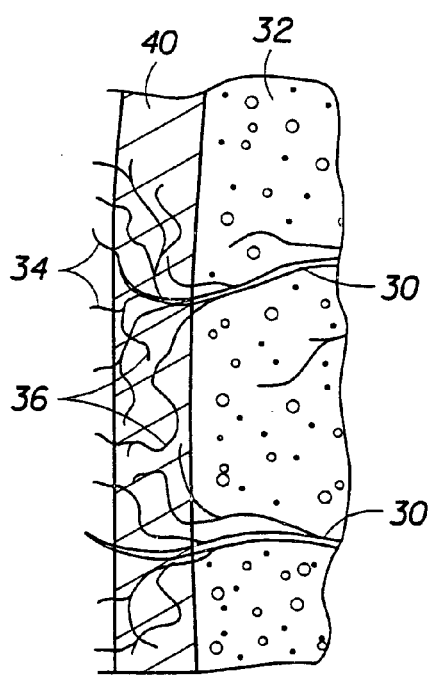
FIG. 5
(PRIOR ART)
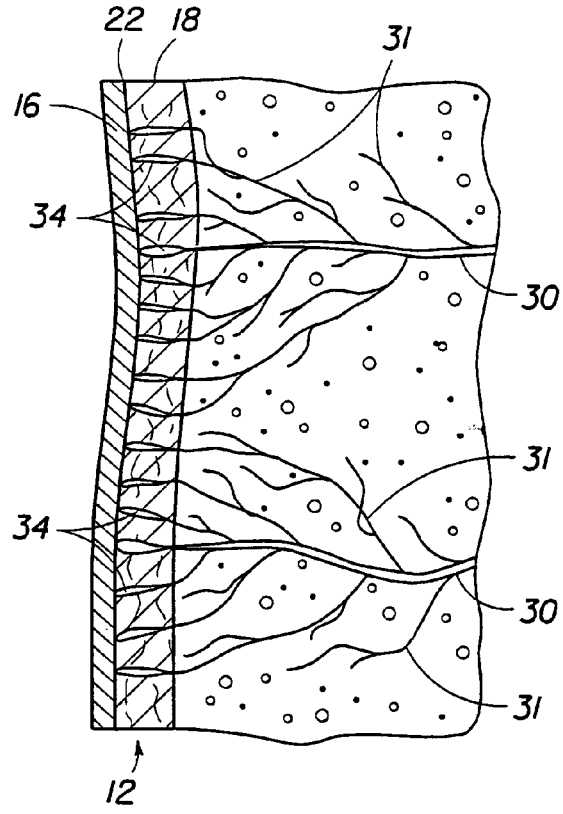
FIG. 6

ROOT GROWTH BARRIER AND METHOD

BACKGROUND OF THE INVENTION

1. Field of the Invention

This invention relates generally to plant containers and root growth barriers, such as for use with landscape plants such as trees and shrubs prior to transplanting.

2. Background of the Related Art

Transplantable plants for use in landscaping, such as trees and shrubs, are generally initially grown in conventional smooth-walled containers made of plastic, steel or other materials. However, when a root contacts the inner sidewall of a smooth walled container the root is deflected and follows the curvature of the container. The result is the production of only a few secondary branch roots. In some cases, roots make several revolutions around the container, mostly at the bottom, forming a coil. The result is an abnormal root system that does a poor job of establishing and supporting the plant following transplanting. Impaired root development following transplanting restricts growth of any species. Poor root development and anchorage is especially detrimental to trees that grow to considerable height and where stresses from wind, ice and snow are exaggerated.

Whitcomb (U.S. Pat. Nos. 4,442,628; 4,510,712; 4,753,037; 4,939,865; and 5,557,886) teaches various sidewall designs with strategic placement of openings in above ground containers to accomplish air-root-pruning (root tip dehydration pruning) to stop root circling and stimulate root branching. These containers work by guiding an actively growing root tip, which is white soft tissue, into an opening where the root tip dehydrates, dies and is, therefore, effectively pruned. The effect on the root system is the same as when a plant is pruned above ground, for example, to make a hedge. Each time the plant is pruned above ground, secondary branches form back as far as about four inches from the point of pruning and through a succession of prunings, a dense plant hedge or screen can be created. An identical phenomenon is seen to occur with roots for the same physiological reasons. Such air-pruning container designs have been successful and are currently sold in various sizes (available under the Rootmaker™ and RootBuilder™ trademarks from RootMaker Products Co., LLC of Huntsville, Ala.).

Van Wingerden (U.S. Pat. No. 5,131,185), Lawton (U.S. Pat. No. 5,099,607) and Henry (U.S. Pat. No. 5,241,784) also teach air-root-pruning by container sidewall design. Butler (U.S. Pat. No. 5,937,577) teaches air-root-pruning as a result of constructing a container out of chicken wire and lining the inside with a woven polyester fabric. Butler (U.S. Pat. No. 5,937,577) does accomplish air-root-pruning throughout the circumference of the container, but the salt accumulation due to the high loss of water to evaporation makes it less efficient in terms of conserving water. This design is generally only practical to use where irrigation water quality is good and humidity is high.

Whitcomb (U.S. Pat. No. 4,497,132) teaches that when root tips are trapped in a saw tooth-like recess as part of the container wall and cannot extend, root tips cease to grow and root branching results. Root circling is reduced and root branching is improved. However, despite the improvements shown by Whitcomb '132, some spiral root growth is still seen to occur because there are so few root-tip-trapping points, and the growth of lateral roots and development of the lateral root tips is sub-optimal. Once roots occupy all root-tip-trapping recesses, as in the '132 container, additional roots would circle and branch poorly, much like a conventional container.

Reiger (U.S. Pat. No. 5,768,825) discloses the use of a monolayer of fabric sewn into a plant preservation and growth control bag. A porous fabric is employed, which restricts the growth of a plant preparatory to transplantation, by catching the roots in the recesses of the fabric. This permits fewer roots to emerge from a layer of fabric, but those that do are prevented from developing further by "girdling" or constriction pruning as a result of fabric entanglement. However, this method is restricted for use during the short time when plants are to be preserved for transplantation and is not suitable for longer-term growth and maintenance. Removal of fabric from plants placed in this system more than a few months is nearly impossible as roots grow through the fabric and develop on the opposite side. Optimal root growth is not maintained because the roots must be broken off at the inside face of the fabric or in the fabric when the fabric is removed. Further, the invention of Reiger ('825) must be used inside a conventional container or in the soil to avoid severe water loss due to evaporation through the fabric.

Therefore, a need exists for a root growth barrier or container for the purposes of encouraging healthy and abundant root growth and permitting optimal development and growth of lateral roots and root tips. It would be desirable if the barrier could provide improved retention of water. It would also be desirable if the barrier could provide a much greater number of root-tip-trapping elements.

SUMMARY OF THE INVENTION

The present invention provides an improved root growth barrier formed by two layers bonded to one another to form a bilayer material. The root growth barrier comprises a thin root-tip-trapping layer that traps or catches the root tips and a layer consisting of a root-impenetrable material formed onto a surface of the root-tip-trapping layer. The root-tip-trapping layer is preferably a fabric, such as a spun bonded and needle punched fabric, a woven fabric, or a knitted fabric. The root-impenetrable material is preferably a polymer film, such as polyethylene, that is bonded to the root-tip-trapping layer. The root-impenetrable layer is preferably also water-impenetrable or water-impermeable. Optionally, the root growth barrier may be used to form a freestanding plant container, for example a container with vertical sides and a flat bottom. Alternatively, the root growth barrier may be placed in other pots or containers, or in open soil. The barrier may also be comprised of biodegradable materials for use in the root-tip-trapping layer, the root-impenetrable layer, or both layers.

A method of using the root growth barrier to grow a plant is also provided. The method may be employed with rolls of the bilayer material. The method comprises the steps of disposing a layer of the bilayer material adjacent to a growth medium and providing a plant in the medium. The method may also be adapted to grow the plant in-ground, wherein the method comprises the steps of placing growth medium in a container comprising a root-impenetrable outer layer and an inner root-tip-trapping layer, disposing the container in soil, and adding a plant in the growth medium.

The present invention maximizes irrigation efficiency by reducing root zone temperatures and preventing evaporation from the barrier or container sidewall, and prevents pathogen infestation and root suffocation as well as nutrient loss. The present invention also provides a means for optimizing temperature effects (even distribution of temperature and shielding of the plant roots from temperature extremes) on growing landscape plants and to prevent algal infestation and competition with the roots for oxygen. The present invention further provides stability of the containers and guards against "blow over" when containers, for example, with vertical sides and flat bottoms, are used above ground.

Other objects, features and advantages of the present invention will be apparent from the following detailed description when read in conjunction with the drawings and appended claims.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a partial cross-sectional view of the root growth barrier shown in FIG. 2.

FIG. 4 is a partial perspective view of a root growth barrier having a knit-type fabric layer providing a high-density of discrete root-tip-trapping elements.

FIG. 5 is a partial cross-sectional view of a prior art air root pruning container.

FIG. 6 is a partial cross-sectional view of the root growth barrier of FIG. 3 illustrating how root tips enter into the root-tip-trapping layer, impinge upon the root-impenetrable layer, become trapped, and experience enhanced root branching.

DETAILED DESCRIPTION OF THE INVENTION

Figure 1:
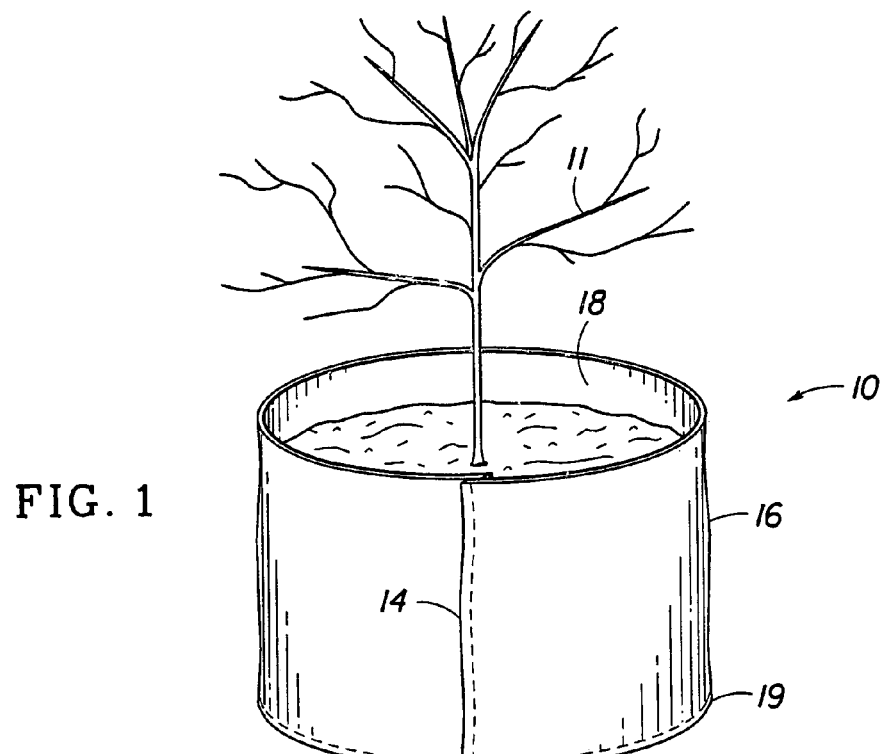
FIG. 1 is a perspective view of a container formed from the root growth barrier of the present invention with a tree growing therein.

The present invention provides a root growth barrier comprising a thin root-tip-trapping layer and a root-impenetrable layer bonded together. Most preferably, the root-impenetrable layer is also water-impenetrable. Multiple root-tip-trapping and root-impenetrable layers are also envisioned. The bonding may be accomplished in a variety of ways, such as lamination or by means of an adhesive. The root growth barrier may be fabricated in a container that retains a growth medium, such as potting soil, without additional support. The advantages of the present root growth barrier include increasing root branching, stopping root circling, decreasing the amount of water needed, reducing root zone soil temperature, improving transplantation of plants to another medium, and generally improving the health and accelerating the growth of the plants. Plants may be grown in said containers for a time period ranging from a few months to several years and from small size to very large size. It is an important aspect of the invention that the root growth barrier improves root branching without air root pruning or constriction pruning.

The layer or layers of root-tip-trapping material of the root growth barrier may be any fabric that, when bonded to a layer of a root-impenetrable material on one side surface (i.e. face-to-face), will provide the bilayer composite with the capacity to trap an actively growing root tip between the fabric's fibers (within the fabric's openings) and against the root-impenetrable material. The fabric fibers need only be thick enough so as to trap the root tip against the root-impenetrable material to stop further root extension. The fibers may be free, looped, knitted, woven or spun bonded so long as the fibers do not deform or stretch when a root pushes against it and provides for very high numbers of root tips to become trapped in the openings on the fabric surface. Even degradable fabrics such as cotton may be used, when the period of root control need only be brief (i.e. confined to one or two months). The degradability of the fabric is especially advantageous in situations where root growth need only be optimized during a short critical period. While the fabric may be made from various materials, the fabric is preferably a polymer such as polypropylene, polyester, nylon, or other olefin. Preferably, a spun bonded needle punched fabric may be used. Preferably, the fabric has a weight ranging from 1 to 10 ounces per square yard, and more preferably ranging from 4 to 6 ounces per square yard. To shield the soil or other growth medium from the effects of light and UV radiation, the root-tip-trapping material is preferably a dark color, most preferably black. It is also preferable for the fabric to have openings of less than ¼ inch, depending on the plants to be grown adjacent the barrier. For stimulating the root growth of woody dicotyledons such as willow and oak trees, the openings preferably have a diameter of between ¹⁄₁₆ inch and ¼ inch. Openings with a size range smaller than ¹⁄₁₆ of an inch are well-suited for use with herbaceous dicotyledons such as tomatoes and petunias.

The root-impenetrable material may be any material that does not permit root penetration, such as films, dense fabrics, aluminum or other metal foil, and plastic sheets. Preferably, the root-impenetrable material is also water-impermeable to prevent water loss there through. The root-impenetrable layer may also be formed by any composition, including polymers, inorganics, and composites, with polymers being the most preferred. Polymers such as vinyl, or polyolefins such as polyethylene, polypropylene, polyisobutene, poly but-1-ene, and poly 4-methyl-pent-1-ene may be used. Preferably, the root-impenetrable layer has a reflective and light colored coating or surface. Most recommended is a white polyethylene layer coating or surface.

The composition of the root-impenetrable material may also comprise additives. For example, where the root-impenetrable material is a polymer, the polymer will preferably include UV inhibitors to provide high UV stability. In a most preferred embodiment, the root-impenetrable material forming the outer layer of a bilayer root growth barrier comprises white polyethylene having a thickness of 2-6 mils and with UV inhibitors for stability. Additionally, the root-impenetrable material may be rigid or flexible and have any desired thickness, including as thick as 2-6 mils, more preferably 3-5 mils.

As mentioned, bonding layers of the root-impenetrable and root-tip-trapping materials may be accomplished by various means, including lamination or using an adhesive. For example, an outer white polyethylene layer may be glued to an inner fabric layer that is either spun bonded and needle punched or a woven or knitted fabric. Any glue may be used, provided it is water-insoluble. Furthermore, any lamination techniques may be used, provided that the lamination temperature employed does not melt the root-tip-trapping layer. Alternatively, one of the layers may be formed directly onto the other layer, such as the root-impenetrable material being sprayed over the root-tip-trapping layer.

Another embodiment of the invention includes the use of the root growth barrier, comprising one or more root-tip-trapping layers and one or more root-impenetrable layers, to form containers wherein plants may be placed and grown for shorter or longer periods of time. The containers may have any shape or size, provided that the root-tip-trapping layer is closely juxtaposed against the growth medium containing the plant. In a preferred embodiment of the invention, the container is cylindrical in shape. This is particularly advantageous in that it provides vertical sides and a flat bottom portion to the container, having close contact with the ground. This contact keeps the root zone of the plant cooler in the summer and warmer in the winter because of increased heat transfer with the ground. The containers are preferably assembled by stapling or sewing along the edges of the root growth barrier, such as with a conventional sewing machine or a surger-type sewing machine. Such assembly provides for greater irrigation efficiency and reduces risk of pathogen infection, because the growth medium in the container of the present invention is kept uniformly moist throughout, and excess water is allowed to slowly seep from the seams at the bottom or side of the container. By contrast, growth medium in a conventional smooth plastic container may drain excessively or have dry areas.

The root growth barrier may be used to make containers of various sizes for use in growing various types of plants. The size or volume of the container may be enlarged for use in growing larger plants, or plants at a later state of development. For example, a container for a woody plant may be provided, with a diameter of 5 inches and a capacity of 1 gallon, a diameter of 18 inches and a capacity of 15 gallons, or a diameter of 72 inches and a capacity of 250 gallons or higher. Similarly, a smaller container may be provided for use in growing herbaceous dicotyledons, such as tomatoes or woody monocotyledons, such as palm trees. Optionally, handles may be cut into the tops of the container to permit grasping with the hand for ease of transport.

Additionally, a container comprising the root growth barrier may be functional as a single container placed in ground, or "grow bag," for example in field soil. In contrast with pot-in-pot production, such a method may be more efficacious, because only one pot or container is needed. Because of the presence of the root-tip-trapping layer and the root-impenetrable layer, the roots are necessarily restricted to the container volume. If plants are to be harvested from the container, harvesting is faster and easier than using prior art containers, due to the fact that roots are restricted to the volume of the container. Since no roots are lost at time of harvest, harvesting can be done at any time of year with little or no stress to the plant. Additionally, when the root-tip-trapping and root-impenetrable layers are biodegradable, plants may simply be left in the ground permanently, having been stabilized with optimal root growth conditions during early critical periods of growth. After the layer has degraded, the roots are able to grow without further restriction.

The present invention further provides methods of using the root growth barrier bilayer in horticulture and recreational gardening. Rolls of the bilayer, suitable for lining plant pots and other containers, may be produced. The root growth barrier may be used above ground by cutting strips of the bilayer and forming them into a lateral barrier lining the interior of a pot. For inhibition of roots growing in a basilar direction, a piece may be cut from the roll to line the bottom of the pot.

The root growth barrier may also be adapted for use in the pot-in-pot plant production technique. Pot-in-pot consists of installing a primary or socket pot in a soil that drains well. A second or "production pot" is inserted into the primary pot for the purpose of growing a tree or shrub. Advantages of this technique are that plants cannot blow over and are insulated from seasonal temperature extremes. By making the production pot a container comprising the root growth barrier, any root circling or other disadvantages arising from use of conventional smooth pots, are eliminated. Importantly, the most common difficulty with implementing the pot-in-pot technique, namely roots escaping through both sets of drain holes, is eradicated.

It should be apparent that the unique bilayer construction of the claimed root barrier offers many advantages over existing systems or containers for preventing root circling and abnormal or weakened root growth and promoting water conservation. However, one or more layers of either the root-tip-trapping or the root-impenetrable material may be used. Furthermore, because the barrier provides greater irrigation efficiency and cooler soil temperatures than do conventional plastic containers, the barrier promotes healthier plants overall and ones that grow faster, whether the plants are ultimately transplanted or maintained permanently in the root growth barrier container.

Referring now to FIG. 1, a side elevational view of container 10 of the invention with a tree 11 growing therein is illustrated. The container 10 is shown having a vertical seam 14 and a bottom perimeter seam 19 that provide uniform moisture and decrease water requirements. The seams may be formed by sewing, stapling, or any other method of fastening the edges of the material. While it is preferred that the seams allow some water seepage, the seam may also be formed by sealing at least the root-impenetrable layer. It is also anticipated that the seam may be sealed and the seepage may be provided by intentionally perforating a root-impenetrable and water-impenetrable layer in a manner that provides the desired water seepage. The root-impenetrable material 16 is preferably white polyethylene to allow for greater reflectivity and results in a cooler container and soil temperatures as well as water conservation gains. The root-tip-trapping material 18 is preferably a dark colored spun bonded fabric that cooperates with the root-impenetrable layer to trap root tips, stimulate root branching and prevent algal growth in the container.

Figure 2:
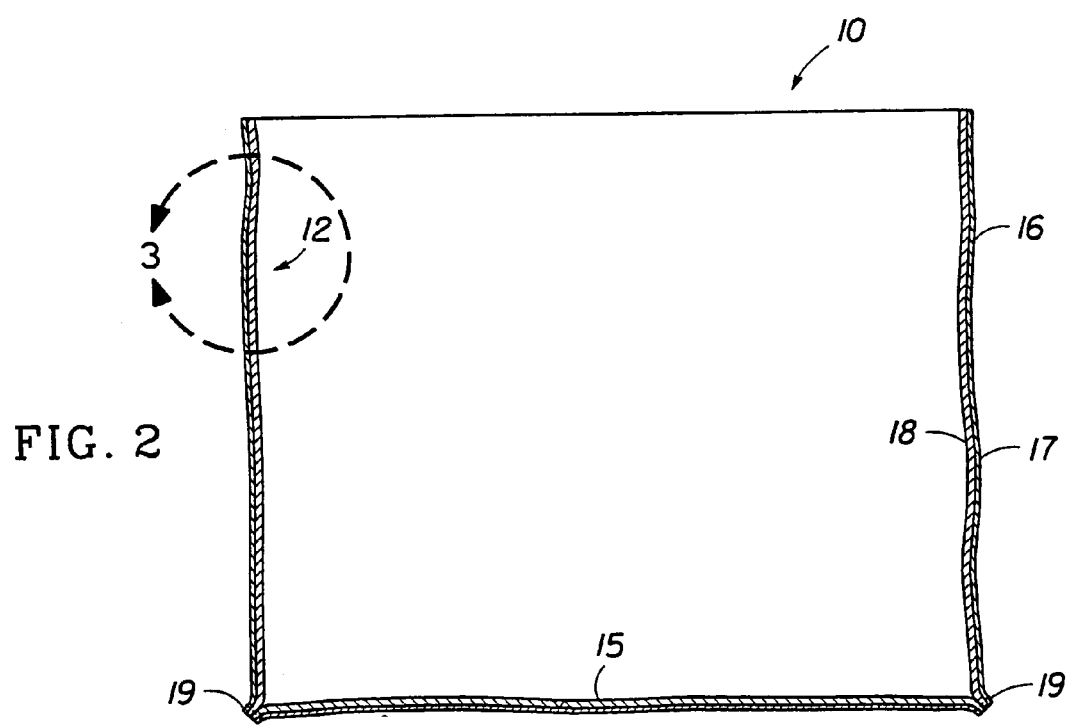
FIG. 2 is a cross-sectional side view of the container shown in FIG. 1.

FIG. 2 is a cross-sectional side view of the container 10 shown in FIG. 1, showing the bilayer in greater detail. The root-impenetrable material 16 is laminated together with the root-tip-trapping material 18, which may be any fabric that would trap roots as they grow into the fabric layer. Seams 19 are shown coupling a floor 15 of the barrier material to the sidewalls 17 of the barrier to form the container 10.

FIG. 3 is a partial cross-sectional view of the root growth barrier 12 shown in FIG. 2, more clearly illustrating its bilayer structure. In a preferred embodiment of the invention, the bonding interface or region 22 between the layers is formed by laminating the root-impenetrable material 16, such as a polyethylene film, onto a fabric root-tip-trapping material 18.

FIG. 4 is a partial perspective view of a root growth barrier 24 having a root-tip-trapping layer of a knit-type fabric 26 providing a high-density of discrete root-tip-trapping elements 28. Plant roots 30 extend through a growth medium (not shown) to penetrate the root-tip-trapping layer 26 and root tips 34 that become trapped against the root-impenetrable layer 16. As a result of root tips 34 becoming trapped, the root tips 34 swell somewhat, become more thick-bodied, give up control and allow side branches 31 to grow. This new root side branching occurs back approximately 4 inches from the tumescent root tip. These new side branches undergo a similar process when they encounter the barrier 24.

FIG. 5 is a partial cross-sectional view of a prior art air root pruning material 40 suitable for forming a container. The roots 30 are allowed to extend through the material 40 such that the root tips 34 are exposed to the surrounding air where the root tips become dehydrated and die. Side branches 36 then grow within the material 40 and may later become air root pruned as well. It should be noted that substantial growth of root side branches 36 occurs within the material 40. However, because the roots pass through the material 40, most of these roots will be broken off when the material is removed. It should also be noticed that there is no barrier to water loss. Furthermore, if the material 40 is used inside a conventional plastic container, the roots will extend through the material and begin to circle against the container wall.

FIG. 6 is a partial cross-sectional view of the root growth barrier 12 of FIG. 3 illustrating how root tips 34 of the roots 30 enter into the layer of root-tip-trapping material 18 and impinge upon the root-impenetrable material 16 to become trapped. As in FIG. 4, it is an important aspect of the invention that the root tips 34 swell and allow enhanced root side branches 31 to grow within the growth medium 32. Accordingly, when the plant is removed from the root growth barrier 12, or a container made there from, the roots 31 will not be lost. In fact, the barrier 12 may be easily peeled away from the roots with little or no damage to the roots.

EXAMPLE 1

Oak Tree Growth

Twenty oak tree seedlings of uniform size and the same age were selected. On Jul. 14, 2001, these seedlings were placed into white containers formed by sewing together a layer of 3 mil white polyethylene laminated onto a layer of 6 oz. per square yard spun bonded needle punched fabric. The fabric was sewn into a cylindrical wall container, having a flat circular floor, where the spun bonded fabric faced inwardly along both the wall and floor. Ten of the seedlings were placed in such containers, with the growth medium juxtaposed against the inner fabric layer. The other ten seedlings were placed in the same type containers, but with a smooth clear plastic barrier imposed between the growth medium and the inner fabric layer. All twenty plants were watered as needed and grown under identical soil and lighting conditions. Temperature conditions were highly variable, characteristic of North Central Oklahoma during the summer. On August 22, the seedlings were again measured and compared. The seedlings in the containers without the smooth clear plastic barrier added grew from a height of 12 inches on July 14 to an average height of 33.3 inches. An average of three side branches were also observed in these seedlings. Side branches are crucial indicators of increases in stem diameter and strength, and also support additional root growth. The seedlings in the containers with the smooth clear barrier grew from a height of 12 inches on July 14 to an average height of 17.5 inches without producing any side branches.

EXAMPLE 2

Soil Temperature

On Jun. 14, 2001, containers made of a root growth barrier in accordance with FIGS. 1-3, including a white outer layer, were filled with a growth medium and young catalpa trees were planted. At the same time, conventional black plastic containers, as used in the nursery industry, were filled with growth medium and catalpa trees were planted. During the summer, temperatures on the inside of the container wall, where root tips would contact, were monitored. Two examples are given. On Jul. 22, 2001, the ambient air temperature was 104° Fahrenheit. The soil temperature in the containers formed by the root growth barrier with a white external coating was 108° Fahrenheit. The soil temperature in the black plastic pots was 126° Fahrenheit. On Aug. 9, 2001, the ambient air temperature was 105° Fahrenheit. The soil temperature in the containers formed by the root growth barrier with a white external coating was 112° Fahrenheit. The soil temperature in the black plastic pots was 134° Fahrenheit. It was further observed that as the sun moved southward in the sky, heating of the root zone of the black pots accelerated. Inspection of the root systems on Aug. 23, 2001 revealed the presence of white active roots against the inside wall of the bilayer container, even though they had been exposed to direct sun. By contrast, all of the roots on the sunny side of the black plastic containers were dead.

EXAMPLE 3

Root Branching

On Jul. 18, 2001, oak, elm, maple and catalpa trees were planted in 5-inch diameter containers comprising the root growth barrier of Example 1. They were grown in these containers until Aug. 27, 2001. Root density was found to be exceptionally high, and roots were trapped on the order of about 100 root tips per square inch.

EXAMPLE 4

Soil Moisture Retention

Water loss was measured from containers made from the root growth barrier of Example 1, wherein the only avenue of water exit was the stitching/seam around the floor of the container and the one vertical seam. Water loss was also measured from containers made from the root growth barrier of Example 1, wherein four ¾ inch diameter holes were cut into the floor of the container. Using six containers of each type and three watering and drying sequences, an average water savings of 16% was experienced using the new container design made from the root growth barrier with no conventional drain holes. All containers were the same color and height and were used under identical conditions that could have affected drainage.

EXAMPLE 5

Algae Growth

Twelve catalpa tree seedlings were planted in growth media with two containers and maintained under identical watering, lighting, temperature and soil conditions typical of North Central Oklahoma. The first container was constructed by laminating a 3 mil sheet of while polyethylene onto a black layer of 6 oz. per square yard spun bonded needle punched polypropylene fabric. The second container was a conventional style plastic container that was specially made in a white color. After a period of 6 weeks, the plants were removed from the two containers and the roots were examined. The roots of the plants from the container made from the bilayer root growth barrier were free from algae, whereas the roots of the plant from the second container had a very noticeable algae covering and roots against the outside wall were green.

EXAMPLE 6

Root Barriers in Soil

Trees on golf courses, especially elms, maples and cottonwoods, require some form of root control in order to keep the roots from competing with and stunting the turf. Additionally, areas such as sidewalks, flower beds and gardens are also susceptible to massive root proliferation and damage. A root growth barrier of the instant invention could be used to line an undersoil trench near a golf green or flower bed to shield the area from tree root competition. The poly coated spun bonded fabric would be placed with the fabric side against the side of the trench nearest the tree. Resulting root tips are then trapped and forced to branch, but they cannot extend through the fabric and into the vicinity of the green or flower bed. The difference in growth of turf and flowers before and after the tree roots are cut and restricted can be dramatic.

EXAMPLE 7

Root Barriers Under Plants in Conventional Containers

Plants with aggressive root systems (crapemyrtle, *Lagerstroemia indica*) in conventional containers were placed on the bilayer root barrier with the spun bonded fabric side uppermost and on conventional woven ground cover fabric. After 2 months, roots had exited the drain holes of the containers. Plants on the bilayer root barrier material were easily lifted and moved for harvest. By contrast, plants on the woven material had some roots through the fabric and into the soil below and were large enough so that the roots had to be cut before the plants could be moved.

The term "comprising" means that the recited elements or steps may be only part of the apparatus or method and does not exclude additional unrecited elements or steps.

It will be understood that certain combinations and sub-combinations of the invention are of utility and may be employed without reference to other features in sub-combinations. This is contemplated by and is within the scope of the present invention. As many possible embodiments may be made of this invention without departing from the spirit and scope thereof, it is to be understood that all matters hereinabove set forth or shown in the accompanying drawings are to be interpreted as illustrative and not in a limiting sense.

I claim:

1. A root growth barrier, comprising a layer of a root-tip-trapping material bonded to a layer of a root-impenetrable material.

2. The barrier of claim 1, wherein the root-impenetrable material is water-impenetrable.

3. The barrier of claim 1, wherein the root-tip-trapping material comprises greater than 10 root-tip-trapping elements per square inch.

4. The barrier of claim 1, wherein the root-tip-trapping material is a porous fabric.

5. The barrier of claim 4, wherein the porous fabric has a weight per square yard of between 2 and 10 ounces.

6. The barrier of claim 5, wherein the porous fabric has a weight per square yard of between 4 and 6 ounces.

7. The barrier of claim 4, wherein the porous fabric has openings between 1/16 and 1/4 inch.

8. The barrier of claim 4, wherein the porous fabric is a spun bonded, needle punched fabric.

9. The barrier of claim 8, wherein the porous fabric is selected from polyester, polypropylene or other olefin fiber.

10. The barrier of claim 4, wherein the porous fabric is a woven or knitted fabric.

11. The barrier of claim 10, wherein the porous fabric is degradable.

12. The barrier of claim 11, wherein the porous fabric is cotton.

13. The barrier of claim 4, wherein the porous fabric is opaque.

14. The barrier of claim 13, wherein the porous fabric is black or gray.

15. The barrier of claim 1, wherein the root-tip-trapping material is bonded onto the root-impenetrable material by a method selected from gluing, laminating and combinations thereof.

16. The barrier of claim 1, wherein the root-impenetrable material is comprised of a plurality of layers.

17. The barrier of claim 1, wherein the root-impenetrable material is reflective.

18. The barrier of claim 1, wherein the root-impenetrable material is a polymer sheet.

19. The barrier of claim 18, wherein root-impenetrable material is white.

20. The barrier of claim 1, wherein the root-impenetrable material is selected from polyethylene and polypropylene.

21. The barrier of claim 1, wherein the root-impenetrable material is metal.

22. The barrier of claim 1, wherein the root-impenetrable material is a metal foil.

23. The barrier of claim 1, wherein the root-impenetrable material is aluminum foil.

24. The barrier of claim 1, wherein the root-impenetrable layer is impervious to UV radiation.

25. The barrier of claim 1, wherein the root-impenetrable layer has a thickness between 2 and 10 mils.

26. The barrier of claim 25, wherein the root-impenetrable material is water-impenetrable.

27. The barrier of claim 1, wherein the root-impenetrable layer has a thickness between 3 and 5 mils.

28. The barrier of claim 1, wherein the root-impenetrable material is biodegradable.

29. The barrier of claim 28, wherein the biodegradable material is selected from wood, fiber, starch, polyhydroxyalkanoates, polycaprolactone, polylactide aliphatic copolymer, polylactide, aliphatic polyester, an aliphatic-aromatic copolymer, and combinations thereof.

30. The barrier of claim 1, wherein the root-tip-trapping layer comprises a plurality of strata.

31. The barrier of claim 1, wherein the root-tip-trapping material comprises greater than 100 root-tip-trapping elements per square inch.

32. An apparatus, comprising:
a root-impenetrable container for growing a plant; and
a root-tip-trapping material bonded to an inner wall of the container.

33. The apparatus of claim 32, wherein the container is formed into a shape selected from cylinders, squares, rectangles, cubes, blocks, hexagons, octagons, ovals, pentagons, triangles and circles.

34. The apparatus of claim 32, wherein the container has a diameter between 2 and 96 inches.

35. The apparatus of claim 32, wherein the container has a diameter between 5 and 60 inches.

36. The apparatus of claim 32, wherein the root-tip-trapping material is a spun bonded, needle punched fabric.

37. The apparatus of claim 36, wherein the fabric has a density between 2 and 10 ounces per square yard.

38. The apparatus of claim 36, wherein the fabric has a density between 4 and 6 ounces per square yard.

39. The apparatus of claim 36, wherein the container is a grow-bag or in-ground container.

40. The apparatus of claim 36, wherein the container is a production pot in pot-in-pot production.

41. The apparatus of claim 32, wherein the root-impenetrable container comprises polyethylene and the root-tip-trapping material comprises spun bonded fabric.

42. The apparatus of claim 41, wherein the polyethylene has a thickness between 2 and 10 mils.

43. The apparatus of claim 41, wherein the polyethylene has a thickness between 3 and 5 mils.

44. The apparatus of claim 41, wherein the polyethylene contains additives.

45. The apparatus of claim 44, wherein the additives comprise UV inhibitors.

46. The apparatus of claim 32, wherein the root-tip-trapping material is black or grey.

47. The apparatus of claim 32, wherein the root-tip-trapping material is a woven or knitted fabric.

48. The apparatus of claim 32, wherein the container is assembled by sewing or stapling.

49. A method of growing a plant in a pot comprising the steps of:
- disposing a bilayer root growth barrier consisting essentially of a root-tip-trapping inner material bonded to a root-impenetrable material;
- disposing a growth medium adjacent to the root growth barrier; and
- adding a plant to the growth medium.

50. A method of growing a plant in-ground, comprising the steps of
- placing growth medium in a container comprising a bilayer consisting essentially of a biodegradable root-impenetrable outer material bonded to an inner root-penetrable material; and
- adding a plant to the growth medium.

51. A root growth barrier, consisting essentially of:
- a layer of a root-tip-trapping material bonded to a layer of a root-impenetrable material.

52. A root growth barrier, comprising:
- a polymer sheet having a surface bonded to a porous fabric.

53. The barrier of claim 52, wherein the porous fabric has a weight per square yard of between 4 and 6 ounces.

54. The barrier of claim 52, wherein the porous fabric has openings between 1/16 and 1/4 inch.

55. The barrier of claim 52, wherein the porous fabric is selected from spun bonded and needle punched fabric, woven fabric, and knitted fabric.

56. The barrier of claim 52, wherein the porous fabric is selected from polyester, polypropylene and cotton.

57. The barrier of claim 52, wherein the polymer sheet is white and the porous fabric is black.

58. The barrier of claim 52, wherein the porous fabric is bonded onto a polyethylene sheet by a method selected from gluing, laminating and combinations thereof.

59. The barrier of claim 52, wherein the polymer sheet is a polyethylene sheet has a thickness between 2 and 10 mils.

60. A root growth barrier, comprising:
- a polyethylene sheet; and
- a porous fabric layer bonded to a surface of the polyethylene sheet, wherein the porous fabric layer is selected from spun bonded and needle punched fabric, woven fabric, and knitted fabric.

61. The barrier of claim 60, wherein the polyethylene sheet is white and the porous fabric layer is black.

62. The barrier of claim 60, wherein the porous fabric layer is bonded onto the polyethylene sheet by a method selected from gluing, laminating and combinations thereof.

63. The barrier of claim 60, wherein the polyethylene sheet has a thickness between 2 and 10 mils.

64. The barrier of claim 60, wherein the porous fabric layer has a weight per square yard of between 2 and 10 ounces.

65. The barrier of claim 60, wherein the porous fabric layer has a weight per square yard of between 4 and 6 ounces.

* * * * *